June 27, 1939.  R. M. R. COURTOIS-SUFFIT ET AL  2,163,746
APPARATUS FOR MARKING THE POSITION OF A VEHICLE ON A MAP
Filed April 16, 1935   4 Sheets-Sheet 1

Inventors:
ROGER MAURICE ROBERT
COURTOIS-SUFFIT
and HENRY EUGENE
TAILLEFERRE by: Haseltine, Lake & Co.
Attys Inventors:
ROBERT MAURICE ROBERT
COURTOIS-SUFFIT
and HENRY EUGENE
TAILLEFERRE
by: Haseltine, Lake & Co.
Attys Patented June 27, 1939

2,163,746

UNITED STATES PATENT OFFICE 2,163,746

APPARATUS FOR MARKING THE POSITION OF A VEHICLE ON A MAP

Roger Maurice Robert Courtois-Suffit and Henri Eugène Tailleferre, Paris, France Application April 16, 1935, Serial No. 16,654
In France April 14, 1934

7 Claims. (Cl. 40—42)

The present invention has for its object an apparatus for marking on a chart the travel of a vehicle moving with respect to the earth without any direct connection therewith, that is to say a ship or an aircraft. The apparatus according to the present invention essentially comprises a plane or circular geographic chart and an index, movable with respect to each other in such manner that the index is always located on the point of the chart corresponding to the geographic position of the vehicle equipped with the apparatus in question.

The distance a vehicle has travelled during the unit of time is determined at any time by a vector corresponding to its velocity, account being taken of the direction along which this vehicle has been travelling with reference to a fixed direction chosen as the origin. For practical purposes this vector will be materialized by its projections on two axes of coordinates preferably at right angles to each other and one of which corresponds to the direction chosen as origin. Under these conditions, it will suffice, in order to cause the index always to indicate the point of the chart corresponding to the geographic position of the vehicle, to cause the chart on the one hand and the index on the other hand to move in respective directions corresponding to the axes of coordinates that have been chosen, at respective rates corresponding to the projections of the above mentioned vector on said axes of coordinates respectively.

The problem would be relatively simple if, as in the case of a vehicle moving directly on the ground, there was always a direct connection between the ground and the vehicle, that is to say if it were possible accurately to determine the velocity of the vehicle with respect to the ground. This is not the case for ships or aircraft, which move in a fluid itself in movement with respect to the ground.

The device according to the present invention is essentially characterized in that it includes means for determining and recording, at any time, the velocity V of the vehicle with respect to the surrounding fluid, and the angular displacements of the vehicle with reference to a direction chosen as origin and indicated by a compass, these variable elements being transformed through mechanical means into relative displacements of the index and the chart proportional to the projections, upon the axes of coordinates, respectively, of the vector representing the velocity both in magnitude and direction.

Furthermore, in order to take into account the relative displacement of the fluid itself with respect to the ground, these displacements of the chart and the index are automatically modified in accordance to this relative displacement of said fluid.

Theoretically this correction should vary constantly since the direction and the velocity of the fluid (water or air) may vary constantly. According to the present invention, we record and incorporate in the indications of the apparatus only the mean values of this correction for certain intervals of time, these mean values being determined by observing from time to time the errors of recording, that is to say the differences between the point marked by the index on the chart and the geographic position of the vehicle, as determined directly. If the initial value chosen for this correction is sufficiently accurate, the distance between the true position and the position marked by the index on the chart is always small enough for permitting to observe from the vehicle the point of the ground corresponding to the indications of the apparatus. It should be noted that, in the case of fog, these corrections become unnecessary because the relative displacement of the fluid, and more particularly air, in the case of an airplane, is negligible.

One of the essential characteristics of the present invention consists in the device permitting, through this observation, immediately to effect the correction to be incorporated in the indications of the apparatus, that is to say suitably to modify the velocity of the displacement of the chart and the index with respect to each other. It should first be noted that this modification must not depend upon the absolute value of the difference between the true position of the vehicle and the position marked on the chart, but upon the ratio of this difference and of the time at the end of which it has been observed. In other words, if a difference of one kilometer is found to exist between the true position occupied by the vehicle and the position marked on the chart by the index, the correction to be made in the indications of the apparatus must be four times greater if the difference corresponds to a quarter of an hour of flight than if it corresponds to a flight of one hour.

Other features of the present invention will result from the following description of some specific embodiments thereof.

Preferred embodiments of the present invention will be hereinafter described with reference to the accompanying drawings, given merely by way of example, and in which.

Figure 1:
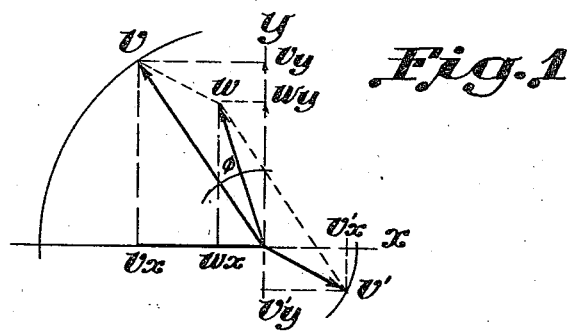
Fig. 1 is a diagrammatical view illustrating the principle of the present invention.

As shown by Fig. 1, the displacement of the vehicle is determined, at any time, by the angle $\Phi$ existing between the direction of the displacement and the direction chosen as origin, OY, and by the length of the vector OV representing the velocity of said vehicle. According to the present invention, these polar coordinates are replaced by rectangular coordinates, by projecting vector OV at $OV_y$ on axis OY and at $OV_x$ on axis OX.

The position of the vehicle will be exactly marked on the chart if said chart moves in direction OY with a velocity proportional to $OV_y$ while the index moves in a direction at right angles with a velocity proportional to $OV_x$.

In order to obtain this result accurately, it would be necessary to have means for measuring the vector OV that represents the true velocity of the vehicle with respect to the ground. Now, as above explained, it is possible accurately to measure only the velocity of the vehicle with reference to the fluid in which it is moving. Therefore, if OV is taken to represent this relative velocity, in order to obtain a correct recording of the displacement of the vehicle with respect to the ground, it is necessary to add a correction corresponding to the velocity of said fluid with reference to the ground. If this last mentioned velocity is represented in magnitude and direction by vector $OV'$, the projections of which on the axes of coordinates are $OV'_y$ and $OV'_x$, a correct recording is obtained on the chart by displacing said chart and its index proportionally to the projections $OW_y$ and $OW_x$ on the axes of coordinates of the resultant of vectors OV and OV'.

As above stated, the apparatus according to the present invention makes it possible automatically to incorporate into variables $OV_y$ and $OV_x$ these corrections $OV'_y$ and $OV'_x$. The mechanism performing this operation is relatively simple and will be hereinafter described. The difficulty lies in the determination of these corrections.

These corrections $OV'_x$ and $OV'_y$ are themselves variable. Therefore, in order to obtain a theoretically perfect solution of the problem, it would be necessary to be able to measure their value at every moment and then to incorporate the momentary value thus obtained into the indications of the apparatus.

According to the present invention, we periodically measure the mean values of these corrections corresponding to a determined interval of time, and we incorporate the mean value corresponding to one interval of time during the next interval of time, and so on. As the direction and the velocity of the surrounding fluid do not vary very much during a short interval of time, this solution is sufficient for practical purposes.

The correction to be chosen when the vehicle starts, that is to say the mean value of vector $OV'$ during the first period of the flight, can be determined with a sufficient approximation from the meteorological indications available at the airdrome from which the aircraft is starting. On the contrary, during flight, the modifications to be made to this correction will be determined, for practical purposes, by the difference observed, after a certain time of flight, between the geographical position really occupied by the aircraft and the position marked on the chart by the index of the apparatus. The initial correction or the correction corresponding to the preceding period is then automatically modified in accordance with the value of the difference thus observed.

Figure 2:
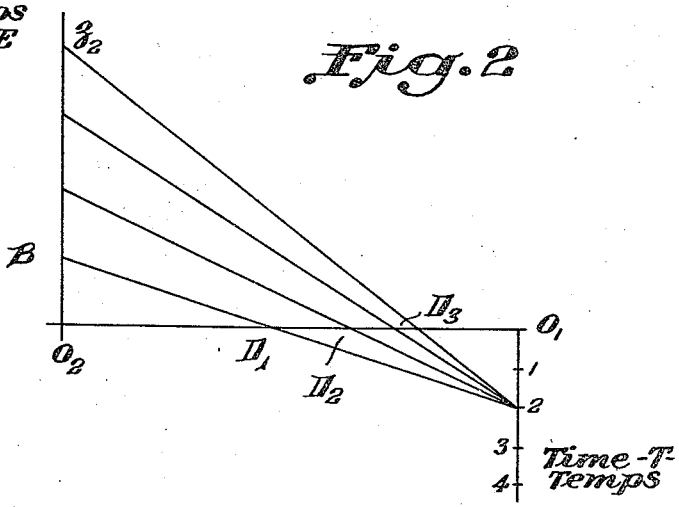
Figs. 2 and 3 are diagrams illustrating the principle of two embodiments of the apparatus for determining the correction to be made, as a function of the time and of the difference between the position of the vehicle and the position marked on the chart.

The principle of the apparatus for determining this correction in accordance with the difference thus observed is diagrammatically shown by Fig. 2.

As above stated, the correction to be made after an observation of the geographic position really occupied by the aircraft as compared with the position marked on the chart depends not only upon the value of the difference resulting from this observation but upon the length of the period of time at the end of which this observation was made. In point of fact, calling E, the difference observed, and T the length of this period of time, the correction is determined by the ratio $$K = \frac{E}{T}$$

For instance, this correction must be the same for a difference of 2 kilometers observed at the end of a period of time of four hours as for a difference of 1 kilometer observed at the end of a period of time of two hours.

In order to materialize the value of this ratio, according to a first embodiment diagrammatically illustrated by Fig. 2, the correcting device includes two marks A and B, connected together by a straight line, these two marks being movable from two origins $O_1$ and $O_2$ in parallel directions $O_1Z_1$ and $O_2Z_2$. The first mark, A, moves with a uniform speed so that distance $O_1A$ is always proportional to the time having elapsed since the origin of time. Index B is, after an observation of the difference between the true position of the vehicle and the position marked on the chart, moved manually a distance corresponding to this difference. As a matter of fact, for practical purposes, this observation will be made in two operations, so as to measure the differences on the axis of abscissas and on the axis of ordinates, respectively. The diagrammatical view of Fig. 2 corresponds to the correction along one of these axes, the correction along the other axis taking place in the same manner.

It is clear that, in Fig. 2, if E is the difference between the true position of the airplane as observed and the position marked on the chart, this distance being represented by $O_2B$, and if T is the period of time at the end of which the observation was made, this period being represented by $O_1A$, we have the following relation:

$$K = \frac{O_2B}{O_1A} = \frac{O_2D_1}{O_1D_1}$$

Therefore, to every position of point D there corresponds a single value of K and conversely. If the point of intersection of stationary straight line $O_1O_2$ and movable straight line AB is materialized, it is possible, for each position $D_1$, $D_2$, $D_3$, etc. of this point, and through a suitable mechanism, to modify the rate of displacement of the index or of the chart by an amount proportional to the corresponding value of K.

This device therefore complies with the requirements above stated.

Figure 3:
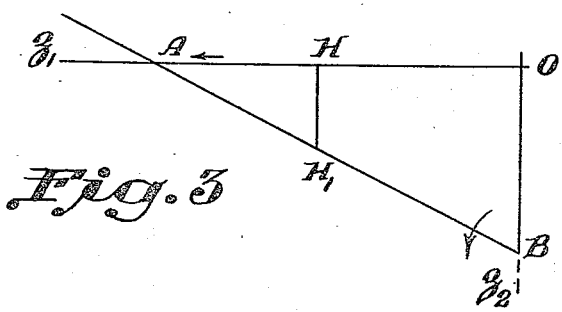

According to another embodiment, illustrated by Fig. 3, instead of causing the marks or indexes A and B to move in parallel directions, these indexes are caused to move along lines $OZ_1$ and $OZ_2$ at right angles to each other and the tangent of angle OAB is measured, this tangent being proportional to the ratio of the distance and the time.

It therefore suffices to materialize a straight line AB such that point B thereof moves along axis $OZ_2$ in such manner that OB is equal to the difference above mentioned, said line intersecting line $OZ_1$ at a point A thereof such that OA is proportional to the time.

For practical purposes, we provide a straight element AH, of constant length, which slides along line $OZ_1$, the point $H_1$ of line AB where said line intersects line $HH_1$ parallel to $OZ_2$ controlling the displacement of a regulating organ as above explained, whatever be the position of point A on line $OZ_1$.

Figure 4:
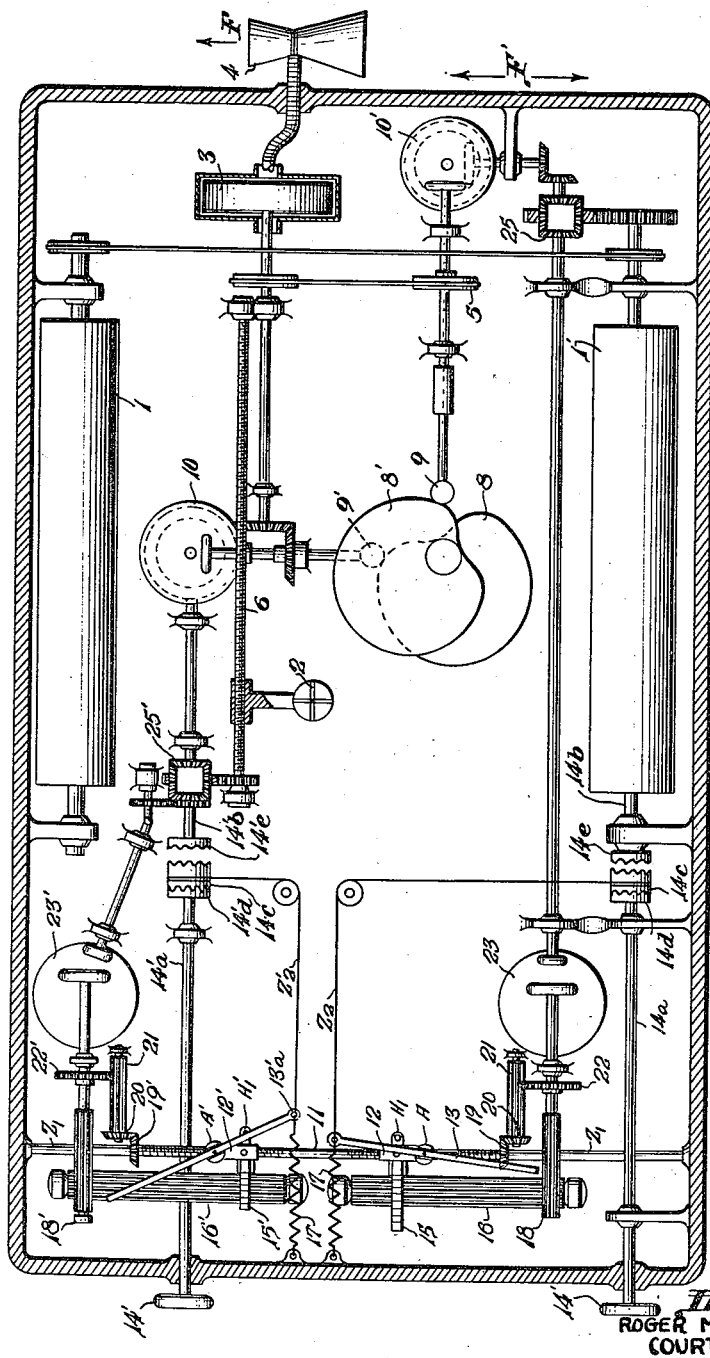
Fig. 4 is a diagrammatical view showing the whole of an apparatus according to the present invention.

We will now describe a first embodiment of the apparatus according to the present invention, as shown by Fig. 4.

The apparatus according to the present invention essentially comprises two rollers 1 and 1' around which the map is wound, these rollers being driven by a suitable motor, such as the turbine 3, so as to produce displacements of the map, in either of directions F and F', that are proportional to the projection $OV_y$ of vector OV. An index 2, driven by the same motor, moves transversely to this direction at a rate proportional to the projection $OV_x$ of the same vector OV.

The mechanism through which the rollers and the index are driven includes two essential elements to wit, on the one hand the turbine rotating at a rate proportional to the absolute value of vector OV, and on the other hand, an element recording the angles $\Phi$ made by this vector with the direction taken as origin, that is to say OY, this last mentioned element transforming the displacement of the element turning at a rate proportional to OV into two displacements proportional on the one hand to $OV_y$ for controlling rollers 1 and 1' and on the other hand to $OV_x$ for controlling index 2.

The driving element turning at a rate proportional to the velocity of the vehicle (airplane for instance) consists for instance of a suction turbine 3 subjected to the action of a Venturi tube or analogous device 4, the movement of this turbine being transmitted on the one hand to rollers 1, 1' through transmission and, on the other hand, to index 2, through transmission 6.

The element responsive to the value of angle $\phi$ consists of a compass 7, or the equivalent, direction OY being the North-South direction of this compass. In order to utilize the angular displacements of this compass for transforming the rotary movement of turbine 3 (proportional to OV) into two movements $OV_x$ and $OV_y$, we provide two cams 8 and 8' rigid with the rotary part of the compass. The profile of each of these cams is determined in such manner that its radii increase proportionally to the sine and the cosine of the angle $\phi$ through which it has turned.

These cams cooperate with two elements 9 and 9' respectively, which act on transmissions 5 and 6 through gradual action change speed devices 10 and 10' (diagrammatically shown in the drawing in the form of friction plates) in such manner as to modify the gear ratio proportionally to the displacements of elements 9 and 9', that is to say to the sine and the cosine of angle $\phi$.

With this arrangement, the chart or map and the index move proportionally to $OV_y$ and $OV_x$ respectively.

The device for recording the variations of the wind and correspondingly correcting the displacements of the map and the index, that is to say for recording the mean values of $OV'_x$ and $OV'_y$ and correspondingly modifying $OV_x$ and $OV_y$ is made in accordance with the principle above described with reference to Fig. 3.

This device includes an endless screw 11 turning at a constant rate and which corresponds to line $OZ_1$ of Fig. 3. Two sliders 12 and 12', screwed on said endless screw 11 are therefore caused to move with a uniform linear speed. Two levers 13 and 13', slidable in these members 12 and 12' respectively, and adapted to pivot about respective points A and A' thereof, in two members carried by sliders 12 and 12'. These members enable levers 13 and 13' to move angularly in such manner that the eye 13a or 13'a through which each lever is fixed to the corresponding cable Z2 or Z'2, respectively moves always along a straight line, shown in the drawings by straight line Z2 and spring 17 or straight line Z'2 and spring 17'.

These levers are operated through said cables Z2 and Z'2 by two drums 14c and 14'c keyed on shafts 14a and 14'a which serve to reset the map.

As shown by the drawings, each end of each of these drums carries teeth or projections adapted to cooperate alternately with toothed pieces located on either side of each drum and at a distance thereof which is such that the drum cannot engage simultaneously both of the pieces corresponding thereto.

One of these toothed pieces 14e (or 14'e, is rigid with a shaft element 14b (or 14'b) through which rollers 1, 1' (or index 2) can be actuated.

The other toothed piece 14d (or 14'd) is mounted in a fixed manner on the apparatus frame and serves to lock the drums in the final position obtained after each reading.

Each drum is elastically urged toward the corresponding piece 14d or 14'd.

When resetting the map. the operations to be performed are the following:

a. Knobs 14 or 14' are pushed toward the right hand side of the drawing, in order to disengage the drums from the corresponding pieces 14d and 14'd and, at the same time, to cause said drums to mesh with toothed pieces 14c and 14'c, whereby said drums are now interconnected with the rollers 1, 1' and the index 2, respectively.

b. Knobs 14 and 14' are then rotated so as to bring the index opposite the correct point of the map. These rotations of knobs 14 and 14' thus transmitted to rollers 1 and 1' and to the index impart to levers 13 and 13' angular displacements proportional to the displacements transmitted to said rollers on the one hand and said index on the other hand.

These levers 13 and 13' act each through an abutment H₁ or H'₁, each corresponding to the straight line HH₁ of the diagram of Fig. 3, on a corresponding rack 15, 15' carried by the respective slider 12, 12', these racks being adapted to mesh, whatever be their position, with long pinions 16, 16'.

The rotation of these pinions shall therefore be proportional to the distance of point H₁ or H'₁ from the corresponding point H of the slider, that is to say to the tangent of the angle made by this lever 13 or 13' with the endless screw 11. In other words, the rotations of these pinions will be proportional to V'ₓ and V'ᵧ.

The rotation can take place in one direction or the other owing to the provision of return springs 17 and 17'.

As above explained, it is necessary to impart a modification corresponding to these rotations to speed OVₓ or OVᵧ. This modification is transmitted in a gradually variable manner to index 2 and rollers 1 and 1' through two cylindrical racks 18 and 18', to which a rotary movement is transmitted from shaft 11 turning at a constant rate, under the action of a motor 11a, and the series of pinions 19, 20, 21, 22 or 19', 20', 21', 22', gradual change speed devices 23 or 23', transmissions 24 or 24' and differential gears 25 or 25'.

The gradual action change speed devices that are shown in the drawings are of complicated construction. Consequently, we will now describe an embodiment of the invention which permits of avoiding the use of such change speed devices intended to record the values of Vₓ and Vᵧ.

Figure 5:
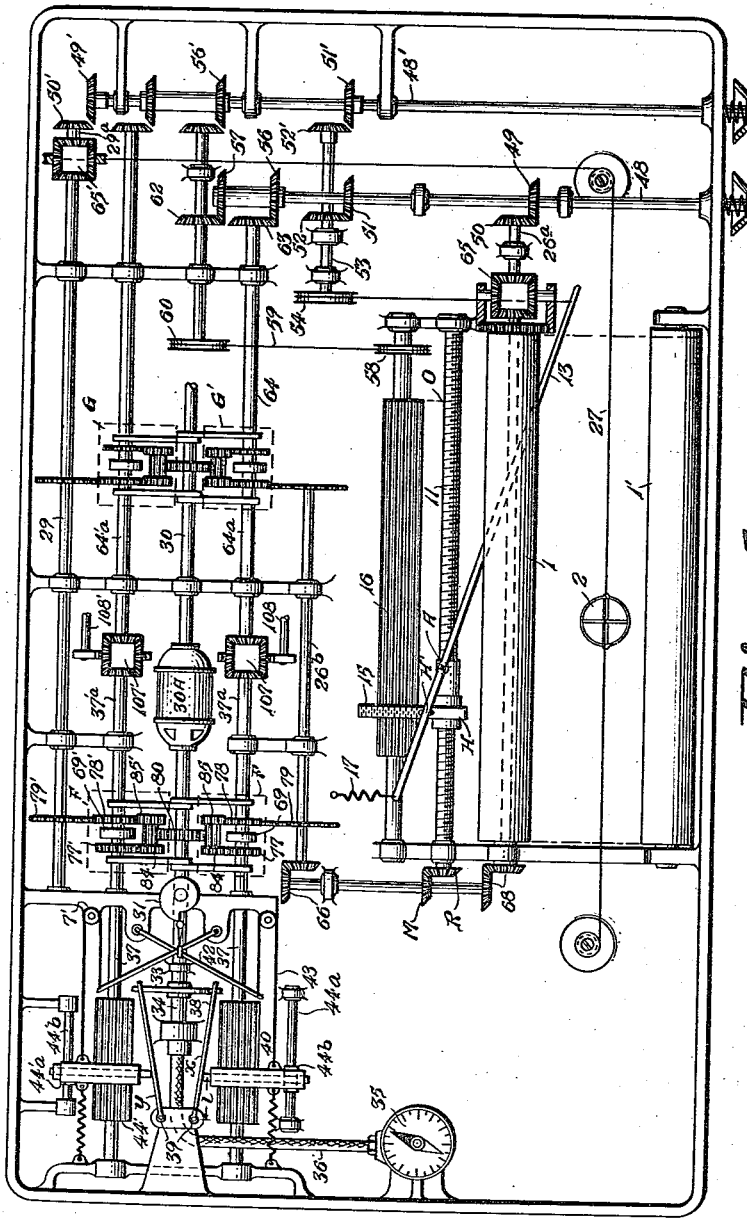
Fig. 5 is a view showing, in a more specific manner, a preferred embodiment of the apparatus according to the present invention.

Fig. 5 illustrates such an embodiment. This figure shows rollers 1 and 1' above referred to, one of these rollers, to wit 1, being keyed on a shaft 26 and driving, through a system of perforations and teeth or projections similar to those used for driving cinematographic films, the map which is wound on, or unwound from, other rollers, not shown by the drawings. This figure also shows the index 2, which moves transversely to the direction of displacement of the map, under the action of a cable 27 winding around a pulley 28 keyed on shaft 29.

In this embodiment, the rollers and the index receive their movements from a motor mechanism which includes a shaft 30, turning at a uniform rate and which is driven, for instance, by an electric motor 30A.

Every revolution of this motor imparts, through a mechanism which will be hereinafter described, to the map rollers and the index a displacement proportional to the values of the velocity and of the course.

Concerning the corrections corresponding to variations of the wind, every revolution of the motor also imparts to the map rollers and the index a displacement proportional to the components of the wind velocity.

The displacements resulting from the algebraic sum of these elementary displacements will give the components of the absolute velocity of the movable body that is considered.

The member indicating the value of velocity OV is diagrammatically shown in the form of a cam 31 acting in the manner of the pointer of an ordinary speed indicator, that is to say occupying a stable or stationary position when the velocity remains uniform and turning about its axis 32 when this velocity varies. The outline of this cam is so determined that the radius corresponding to a fixed point of the space varies proportionally with the angle through which the cam has turned from a predetermined origin.

The member indicating the course that is to say the angle made by the fore-and-aft direction of the airplane with a fixed direction chosen as origin (angle φ of Fig. 1) is also diagrammatically shown in the form of a cam 33 mounted on a shaft 34 and operatively connected with a compass 35 through a transmission diagrammatically shown at 36 (flexible shaft), in such manner that this cam 33 occupies a stationary and stable position when the angle above referred to remains unchanged and turns, when said angle varies, through an angle proportional to this variation. The outline of this cam 33 is determined in such manner that the radius passing through a fixed point of the space varies proportionally to the sine of the angle through which the cam has turned from a predetermined origin, another portion of this cam 33 giving a variation of the radius proportional to the variation of the cosine of this angle.

We will now describe the mechanism permitting the transformation of the respective indications of these cams 31 and 33 into two indications proportional to $V_x = V \sin \phi$ and $V_y = V \cos \phi$, respectively, and measured by angular rotations of shafts 37 and 37' respectively. These angular displacements of shafts 37 and 37' are themselves utilized for imparting corresponding rotations to shafts 26 and 29, through mechanisms F and F', which will be hereinafter described.

Against the periphery of cam 33 two levers 38 and 38' are applied, these levers being pivotally mounted at 39 and disposed, with respect to this cam and due to the profile thereof, in such manner that their points in contact with the outline of the cam move, with respect to a circle of a radius equal to the minimum radius of said cam distances proportional to the sine and the cosine of the angle through which this cam has turned from a predetermined origin, respectively, that is to say proportional to sin φ and cos φ respectively.

As the levers pivot each about a fixed point, each of their points x or y is given a displacement proportional to the distance from said point x or y to the corresponding pivot 39.

In other words, if l is this distance between point x, or y, and the corresponding pivot 39, L the distance between this pivot and the cam, x or y the distance from this point x or y to a line passing through the corresponding pivot 39, or 39', and at right angles to the cam, we have the following relations:

$$x = \frac{1}{L} \cos \phi$$

and $$y = \frac{1}{L} \sin \phi$$

If l is caused to vary proportionally with velocity V, we have:

$$x = KV \cos \phi$$

and $$y = KV \sin \phi$$

The member serving to perform this measurement consists of a rack 40 or 40', carried by a carriage 44b (or 44'b) in which it can slide, each rack bearing, through its lug 38a (or 38'a) against a lever 38 (or 38'). These carriages, suitably guided by guides such as 44a or 44'a, are subjected to longitudinal displacements proportional to V, these displacements being imparted thereto through a member 41 slidable along a longitudinal rod and operatively connected with cam 31 through a transmission which is diagrammatically shown in the drawings as consisting of a lever 42 or 42' and a cable 43 or 43'.

Whatever be its longitudinal position, this rack 40 or 40' meshes with a pinion 44 or 44', of elongated shape, keyed on a shaft 37, or 37', respectively. With this arrangement, these shafts 37 and 37' will turn about their axes through angles proportional to $V \cos \phi$ and $V \sin \phi$, respectively.

Before describing the mechanisms F and F' through which these indications are made use of, we will first describe the organs for introducing the corrections due to variations of the wind. As a matter of fact, these organs are substantially similar to those shown for this purpose in the diagrammatic view of Fig. 4.

The difference consists in that the corrections corresponding respectively to displacements of the map and of the index, that is to say $V'_y$ and $V'_x$ are obtained through a single mechanism with which are successively engaged the control knob 14' which simultaneously brings index 2 opposite the real position of the airplane on the map and correspondingly modifies velocity $V_x$, and the control knob 14 which simultaneously moves roller 1 for bringing the map in correct relative position with respect to the index and correspondingly modifies velocity $V_y$.

This single mechanism is made as one of the corresponding separate mechanisms of Fig. 4. It includes a threaded rod 11 (corresponding to line OZ of Fig. 3) turning at a uniform rate about its axis, under the action of a driving mechanism M. This mechanism, which may be of any conventional type, is provided with a reversing gear, also of any suitable type, causing rod 11 to be rotated at high speed in the opposite direction until slider 12, screwed on said rod 11, has been returned into its initial position, at which time the reversing gear is automatically brought out of action, rod 11 being again rotated at slow speed in the first mentioned direction. It will be readily understood that if this reversing gear R is operated by the pilot immediately after he has brought back the index in to correct position on the map, through manual means 14 and 14', the position of slider 12 on rod 11 at the time of the next operation of the manual means 14, 14' corresponds to the time that has elapsed between these two successive operations of the manual means and the distance from said position of slider 12 to its initial, or zero, position measures this time. On this slider 12 is mounted a lever 13 adapted to slide therein and to pivot about the point A thereof. This lever 13 is adapted to cooperate with an abutment H of a rack 15 slidable with respect to slider 12 in a direction at right angles to the axis of rod 11, said rack being constantly in mesh with a pinion 16 of elongated shape. A spring 17 permits of the rotation being controlled in both directions.

The operation of the means for performing the correction of the rotary movement of rollers 1 and 1' (correction $V'_y$) must permit:

(a) Of turning roller 1 proportionally to the displacement to be imparted to index 2 for bringing it into correct position (as the result of a direct observation of the true position of the airplane); For this purpose knob 14 is mounted on a spindle 48 on which is keyed a pinion 49 in mesh with a pinion 50 operatively connected with shaft 26;

(b) Of imparting to lever 13 a pivoting movement of an amplitude proportional to this displacement of the index. For this purpose, spindle 48 carries a pinion 51 keyed thereon and meshing with a pinion 52 keyed on a shaft 53 the rotation of which controls the pivoting movements of lever 13 through a pulley 54 and a cable 55;

(c) Of transmitting the rotary movement of pinion 16 resulting from a pivoting displacement of lever 13 to a mechanism G analogous to F and permitting, as will be hereinafter described, of performing corrections of the speed proportional to the rotation of this pinion 16. For this purpose, the rotary movement of pinion 16 is transmitted to mechanism G through a pulley 58, a cable 59, a pulley 60 keyed on an intermediate shaft 61, a pinion 62, a set of bevel pinions 56—57, adapted to turn freely about spindle 48 and a pinion 63, keyed on a shaft 64 the rotation of which controls the operation of mechanism G.

It will be noted that, in order to permit of introducing the movement corresponding to the desired correction into the movement of the system, that is to say in order to permit of displacing shaft 26 through knob 14 without interrupting the normal working, that is to say the unwinding of the map under the action of mechanism F, pinion 50 is keyed on a portion of shaft 26a connected to shaft 26 through a differential gear 65.

The operation of the means for performing the correction ($V'_x$) of the rate of displacement of index 2, by means of knob 14' is effected in a fully identical manner, the elements acted upon being a shaft element 29a connected to shaft 29 through a differential gear, lever 13, shaft 64 and mechanism G', the organs of the transmission being designated by the same reference numbers, but with symbol (').

Mechanisms F, F', G, G' are connected to:
(a) The driving shaft 30, turning with a uniform speed of revolution;
(b) Shaft 37, 37', 64 or 64';
(c) One of the driving shafts 26 or 29 through a suitable transmission;

in such manner that, for each revolution of shaft 30, this shaft 26 or 29 turns, with a uniform angular speed, through an angle corresponding to a portion of a complete revolution and which depends upon the displacement of shaft 37, 37', 64 or 64' from its original relative position, that is to say determines the same displacement of the index or of the map as if it (shaft 26 or 29) had made a complete revolution with an angular velocity proportional to this displacement.

Figure 7:
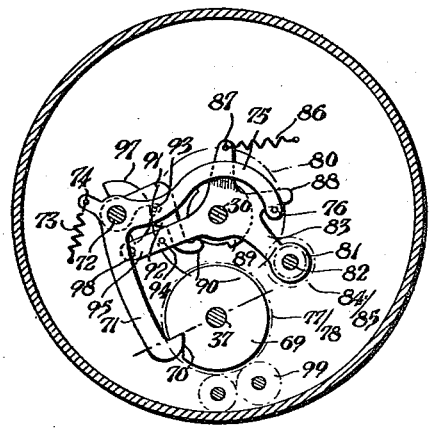
Figs. 7 and 8 illustrate in two conditions of operation the detail of an embodiment of the mechanisms included in the apparatus for moving the chart and the index with respect to each other in accordance with the movement of the vehicle with respect to the surrounding fluid and for correcting these movements as above explained.
Figure 8:
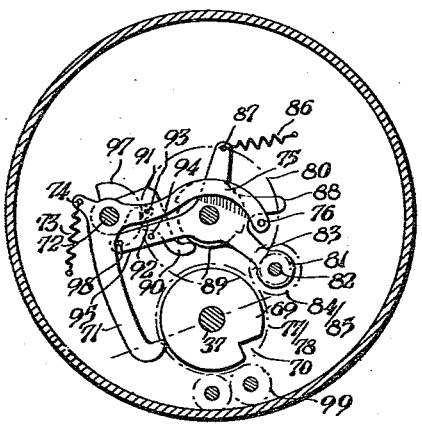

In Figs. 7 and 8, which represent a mechanism of this kind, we have shown driving shaft 30, turning with a uniform speed of revolution, shaft 37, which can be given relative rotations, and shaft 26b, which is connected to shaft 26 through a transmission 66, 67 and 68.

On shaft 37 is keyed a disc 69 provided with a notch 70 which constitutes a kind of mark the angular position of which with reference to an origin T—T (correponding to the state of rest) determines the portion of a turn through which shaft 26b shall turn for every revolution of shaft 30.

Cooperating with this notch 70, there is provided a pawl 71 pivoted at 72 and subjected to the action of a spring 73, acting thereon at 74, so as to urge the end of said pawl toward the periphery of disc 69. This pawl has, integral therewith, a branch 75 carrying a stop 76 adapted to cooperate with organs which will be hereinafter described.

On shaft 37 are mounted two pinions 77 and 78 (Figs. 5 and 6) one of which 77 is keyed on disc 69, while the other one 78 is free to turn and is in mesh with a pinion 79 keyed on shaft 26b. On shaft 30, there is keyed a pinion 80 constantly in mesh with a pinion 81 keyed on a spindle 82 journalled in a support 83 adapted to turn freely about shaft 30. On this spindle 82 are keyed two other pinions 84 and 85 adapted to come into mesh with pinions 77 and 78, respectively.

This support 83 is subjected to the action of a spring 86 fixed thereto at 87, and which tends constantly to bring pinions 84 and 85 into mesh with pinions 77 and 78 respectively. This support carries an arm 88 adapted to cooperate with a finger 76 adapted to cooperate with stop 76 so as to produce a displacement of support 83 against the action of said spring 86 when pawl 71 is pivoted.

On shaft 30, there is keyed a cam 89 including two semi-circular outlines of different respective diameters. This cam cooperates with the end 90 of a lever 91 adapted to turn freely about axis 72 and provided with a projection 92 itself adapted to cooperate with two fingers 93 and 94 carried respectively by lever 71—75 and a prolonged part 95 of support 83.

This mechanism works in the following manner:

When the value to be measured, for instance $Vy=Kl \cos \phi$ is equal to zero, the pawl drops into notch 70, which is located on line TT, chosen as the origin (Fig. 7). Support 83 is then released under the action of finger 76 acting on arm 88. The continuous rotation of shaft 30 is therefore without action on the rotation of shaft 26b, while cam 89 cooperates through its surface of smaller diameter with lever 91.

When this lever 91 is caused to pivot by coming into contact with the point P of the periphery of cam 89 where the diameter thereof changes, said lever 91 acts on finger 93 in such manner as to cause lever 75 to pivot and therefore to remove pawl 71 from notch 70. Disc 69 pivots under the action of spring 96 (Fig. 5) which acts constantly on racks 40 so as to apply them against lever 38, driving the whole of the mechanism and consequently shaft 37 into a position depending upon the value of Vy, as above described and fixed by the action of cams 33 and 31.

Shaft 37 therefore turns through an angle $a$ proportional to this value Vy and remains in its extreme position, for which notch 70 occupies position 70a (Fig. 8), while cam 89 acts on the end 90 of lever 91 through its portion of larger diameter. During this time, support 83, released by the pivoting displacement of the pawl, remains subjected to the action of projection 92 cooperating with finger 94, so that the spindle 82 journalled in this support 83 is free to turn under the action of gear 80—81.

As soon as cam 89 has turned through an angle of 180° and therefore as soon as the end 90 of lever 91 has dropped at P upon the portion of smaller diameter of said cam, support 83 is released and, under the action of spring 86, pinions 84 and 85 carried by this support come into mesh with pinions 77 and 78, which are therefore caused to turn. The rotation of pinion 77 has for its effect to bring back cam 69 into the position of Fig. 7, in which the pawl drops back into notch 70, releases support 83 and therefore stops the rotation of this pinion 77 and of pinion 78. Therefore, the amplitude of the rotation of this pinion 77 is indeed proportional to the angle $a$ above mentioned and consequently to $Vy=Kl \sin \phi$. Now this pinion drives shaft 26b and therefore roller 1. Its rotation can start again only when, shaft 30 having completed its revolution, finger 90 is again lifted by cam 89, the operation above described being then repeated. We have therefore obtained the desired result, to wit a rotation of shaft 26b, and therefore of roller 1 about which the map is wound, proportional (for each revolution of shaft 30 turning with a uniform speed of revolution) to $Vy=Kl \sin \phi$.

It will be noted that the cycle above described includes two periods of time of the same length, determined by the two halves of cam 89, one of these halves corresponding to the setting of the mechanism, that is to say to the rotation of cam 69 in accordance with the value to be measured, which is, so to speak, stored up for subsequent use, the other half corresponding to the utilization of the value thus stored up for producing the proper rotation of the shaft, such as 26b, that is to be driven.

It is therefore possible to utilize in combination two mechanisms of this type for rotating the same shaft proportionally to two different quantities. In the example shown in the drawings, the same shaft 26b shall be driven by both of the mechanisms F and G. Mechanism F causes this shaft to turn through an angle proportional to $Vy=Kl \sin \phi$ for half a revolution of shaft 30, while mechanism G causes the same shaft to turn through an angle proportional to V'y for the next half revolution of shaft 30.

On the contrary, mechanisms F and F', which act on two different shafts respectively can work simultaneously. Besides, the only organ common to both of these mechanisms F and F' is gear 80 keyed on shaft 30.

In this mechanism F', the same organs are designated by the same reference numbers as in F, with the addition of symbol (').

Furthermore, for a given group of mechanisms F and G or F' and G', it is necessary to provide two series of organs, such as above described, serving respectively to turn shaft 26b in one direction and to turn it in the opposite direction, according to the values of $\sin \phi$.

Figure 6:
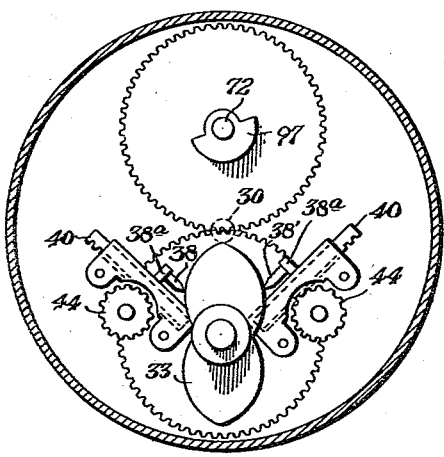
Fig. 6 is an end view of the device shown in Fig. 5 including the racks and pinions and the cam cooperating therewith.

Shaft 37, which measures the absolute value of $Kl \sin \phi$ works in the same manner in both cases but it must bring into play one or the other of two mechanisms, such as that shown in Figs. 6 and 7, adapted to cause shaft 26b to turn in one direction or the opposite direction, according as $\sin \phi$ is positive or negative.

For this purpose, cam 33 is given a continuous outline and will measure only the absolute values of the sine and cosine, but it drives, through pinions 133 and 134, two cams, such as 97 (Figs. 7 and 8), corresponds to mechanism F while there is a similar cam corresponding to mechanism F'. Each of these cams, 97 for instance, determines which of the two series of parts (corresponding to the rotation of shaft 26b, or 29, in one direction or the opposite one) of mechanism F, or F', is to be brought into play, according as $\sin \phi$, or $\cos \phi$, is positive or negative. For this purpose, cam 97, shown in Figs. 7 and 8 serves to wholly disconnect support 83 for one arc of 180° of cam 33 by acting, for this arc, on a finger 98 carried by this mechanism. While this support is thus brought out of operation, the rotation of shaft 26b is controlled through an identical mechanism, not shown in the drawings, acting through pinion 78, said rotation now taking place in the opposite direction owing to the interposition of reversing gear 99, in mesh with another pinion keyed on shaft 26b behind pinion 79.

Owing to this arrangement we may provide behind this map a lamp 103 illuminating the map by transparency.

Furthermore, it may be advantageous, in some cases temporarily to superimpose on the indications of the map, which are traced on a scale corresponding to the gear ratio of the mechanism, views on an enlarged scale, showing for instance the region in which the airplane is to land or portions of the ground that are particularly important.

The map will then be made of a mat and translucent material, forming a screen for the large scale image projected by a film which is unwound in front of lamp 103 at a rate which may be calculated (when the airplane is moving along a straight line in a predetermined direction) in comparison with the rate of unwinding of the map in such manner that the image given by this film automatically corresponds with the point marked by the index on map 101.

It will be noted that the various elements that have been shown in Fig. 5 make it possible to measure at any time the value of vectors $Vx$, $Vy$, $V'x$ and $V'y$, that is to say the projection on both axes of coordinates of the vectors OV representing the velocity of the airplane with respect to the surrounding air, and OV' representing the velocity of said air with respect to the ground.

By combining these indications, it is possible to materialize points V and V', that is to say to obtain the values OV and OV' of the velocity of the airplane with respect to the surrounding air and the velocity of said air with respect to the ground.

It is also possible, by adding together $Vx$ and $V'x$, the sum of which is $Wx$, and $Vy$ and $V'y$, the sum of which is $Wy$, and by combining these values $Wx$ and $Wy$, to materialize point W and therefor to obtain, in magnitude and in direction, the value OW of the velocity of the airplane with respect to the ground.

In the description of Fig. 5, it has been stated that, for each revolution of shaft 30, disc 69 turns through an angle proportional to $Vy$. In a likewise manner, the coresponding elements of mechanism F'—G' turns, during the same period of time, through an angle proportional to $V'y$.

By extending shafts 37 and 64 beyond mechanisms F and G, these extensions being shown at 37a and 64a on the drawings, and by adding up these rotations through a differential gear diagrammatically shown at 107, we obtain, for every revolution of shaft 30, a rotation of the driven shaft 108 of this differential gear of an amplitude proportional to the sum of $Vy$ and $V'y$, that is to say proportional to $Wy$.

In a likewise manner, shaft 108' is caused to rotate, during the same period of time, through an angle proportional to the sum of $Vx$ and $V'x$, that is to say to $Wx$.

Fig. 1 diagrammatically shows a device which permits the combining of the values $Wx$ and $Wy$ in such manner as to materialize the end of vector W.

This device includes threaded rods 108a and 108'a, disposed at right angles to each other and driven by shafts 108 and 108', respectively. On these threaded rods are screwed elements 109 and 109' movable parallelly to the axes of rods 108a and 108'a respectively but prevented from rotating about these axes. These elements carry thin rods 110 and 110' the point of intersection of which indicates the end of vector OW, the origin O of which corresponds to the point of intersection of lines 110 and 110' when shafts 108 and 108' have not been rotated.

However, it will be noted that shafts 37 and 37' and therefore shafts 108 and 108' are given a periodical rotary movement the amplitude of which measures the vectors in question.

In order to avoid subjecting rods 110 and 110' to a corresponding periodical movement, it is necessary to interpose between shafts 108 and 108a on the one hand and between shafts 108' and 108'a on the other hand, mechanisms working in synchronism with the rotation of shaft 30, in such manner that the connection between 108 and 108a, on the one hand and between 108' and 108'a on the other hand is established only at the end of the revolution of shaft 30.

It would be possible to obtain in a wholly analogous manner the values of vectors V and V' measuring the velocity of the airplane with respect to the surrounding air and the velocity of the wind, respectively.

The indicating rods 110 and 110' the intersection of which gives point W shall move upon a diagram including circular lines giving the absolute value of the velocity and radial lines permitting to read the values of the angles.

While we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. An apparatus for indicating the position, with respect to the ground, of a vehicle moving in a fluid itself movable with respect to the ground, which comprises, in combination, a map and an index movable with respect to each other, means for moving said index relatively to said map so as to reproduce the movement of the vehicle with respect to the ground when the movement of said fluid with respect to the ground is not taken into account, means for continuously adding to this movement a movement of adjustable velocity and direction so as to take into account said movement of the fluid relat ve to the ground, manual means for intermittently imparting to said index a relative displacement bringing it back into correct position with respect to the map as otherwise ascertained, a movable member, means for imparting to said member, during each interval between two successive operations of the manual means, a continuous displacement corresponding to the time having elapsed since the first of these two operations, and means operative by both said manual means and said movable member for resetting said correcting means into correct adjustment determined by the actual value of the ratio of these two displacements.

2. An apparatus for indicating the position, with respect to the ground, of a vehicle moving in a fluid itself movable with respect to the ground, which comprises, in combination, a map and an index movable with respect to each other, means for moving said index relatively to said map so as to reproduce thereon the movement of the vehicle with respect to the ground, when the movement of said fluid with respect to the ground is not taken into account, means for continuously adding to this movement a movement of adjustable velocity and direction so as to take into account said movement of the fluid relatively to the ground, manual means for intermittently imparting to said index a relative displacement bringing it back into correct position with respect to the map as otherwise ascertained, a movable member, means for imparting to said member, during each interval between two successive operations of the manual means, a continuous displacement proportional to the time having elapsed since the first of these two operations, and means operative by both said manual means and said movable member for resetting said correcting means into correct adjustment determined by the actual value of the ratio of these two displacements.

3. An apparatus for indicating the position, with respect to the ground, of a vehicle moving in a fluid itself movable with respect to the ground, which comprises, in combination, a map and an index movable with respect to each other, means for moving said index relatively to said map so as to reproduce thereon the movement of said fluid with respect to the ground, when the movement of said fluid with respect to the ground is not taken into account, correcting means for continuously adding to this movement a movement of adjustable velocity and direction so as to take into account said movement of the fluid relatively to the ground, manual means for intermittently imparting to said index a relative displacement bringing it back into correct position with respect to the map as otherwise ascertained, a rod, a member movable along said rod a distance proportional to the relative displacement imparted to said map and said index for bringing them back into correct position, a second rod parallel to the first mentioned one, a member slidable along said second mentioned rod, means for imparting to said last mentioned member, during each interval between two successive operations of the manual means, a continuous displacement proportional to the time having elapsed since the first of these two operations, and means for resetting said correcting means into adjustment according to the value of the ratio of the distances between the origins of the displacements of said members on said rods respectively and the point at which a line passing through both of said members intersects the line passing through both of said origins.

4. An apparatus for indicating the position, with respect to the ground, of a vehicle moving in a fluid itself movable with respect to the ground, which comprises, in combination, a map and an index movable with respect to each other, means for moving said index relatively to said map so as to reproduce thereon the movement of said vehicle with respect to the ground, when the movement of said fluid with respect to the ground is not taken into account, correcting means for continuously adding to this movement a movement of adjustable velocity and direction so as to take into account said movement of the fluid relatively to the ground, manual means for intermittently imparting to said index a relative displacement bringing it back into correct position with respect to the map as otherwise ascertained, a rod, a member slidable along said rod a distance proportional to the relative displacement imparted to said map and said index for bringing them back into correct position, a second rod parallel to the first mentioned one, a member slidable along said second mentioned rod, means for imparting to said last mentioned member, during each interval between two successive operations of the manual means, a continuous displacement proportional to the time having elapsed since the first of these two operations, and means for modifying the adjustment of said correcting means according to the value of the tangent of the angle made by the first mentioned rod with a line passing through both of said members.

5. An apparatus for indicating the position, with respect to the ground, of a vehicle itself movable with respect to said ground, which comprises, in combination, a map and an index movable with respect to each other, means for determining the angle made by the fore and aft direction of said vehicle with a fixed direction, means for determining the velocity of said vehicle with respect to said fluid, means operative by both of the above mentioned means for moving said index relatively to said map so as to reproduce thereon the movement of said fluid with respect to the ground when the movement of said fluid with respect to the ground is not taken into account, correcting means for continuously adding to this movement a supplementary movement of adjustable velocity and direction so as to take into account said movement of the fluid relatively to the ground, manual means for intermittently imparting to said index a relative displacement bringing it back into correct position with respect to the map as otherwise ascertained, a movable member, means for imparting to said member, during each interval between two successive operations of the manual means, a continuous displacement proportional to the time having elapsed since the first of these two operations, and means operative by both said manual means and said member for readjusting, on each manual operation, said correcting means to the actual value of the ratio of these two displacements.

6. An apparatus for indicating the position, with respect to the ground, of a vehicle moving in a fluid itself movable with respect to said ground, which comprises, in combination, a frame, a map movable in said frame with a translatory motion, an index movable in said frame in a direction transverse to the direction of the motion of said map, a compass carried by said frame, a device responsive to the velocity of said vehicle with respect to said fluid carried by said frame, means operative by both said device and said compass for moving said map and said index proportionally to the respective corresponding components of the movement of said vehicle with respect to said fluid, correcting means for continuously adding to this movement a supplementary movement of the map and index, of adjustable velocity and direction so as to take into account the movement of the fluid with respect to the ground, a rod, a member slidable along said rod, means for moving said member along said rod at a uniform speed, a lever both slidable and pivotable in said slidable member, a rack slidable on said slidable member in a direction at right angles to said rod, an abutment on said rack adapted to cooperate with said lever, manual means for intermittently bringing back said map and said index into their correct relative position as ascertained through independent data, means, operatively connected with said manual means, for moving one point of said lever in a direction at right angles to said rod proportionally to one component of the displacement of said map and said index produced by said manual means, and a pinion of elongated shape in mesh with said rack adapted to readjust said correcting means.

7. An apparatus according to claim 6 in which said manual means include a mechanism operatively connected with said map for displacing it in the direction of one component and a mechanism operatively connected with said index for displacing it in the direction of the other component, and means for alternately connecting one or the other of said mechanisms with said lever.

ROGER MAURICE ROBERT
                COURTOIS-SUFFIT.
HENRI EUGÈNE TAILLEFERRE.